United States Patent
Popovski et al.

(10) Patent No.: US 8,832,370 B2
(45) Date of Patent: Sep. 9, 2014

(54) REDUNDANT ARRAY OF INDEPENDENT STORAGE

(75) Inventors: Vladimir Popovski, Irvine, CA (US); Nelson Nahum, Tustin, CA (US); Jeremy M. Pinson, Escondido, CA (US)

(73) Assignee: Netapp, Inc., Sunnyvale, CA (US)

( * ) Notice: Subject to any disclaimer, the term of this patent is extended or adjusted under 35 U.S.C. 154(b) by 281 days.

(21) Appl. No.: 12/959,622

(22) Filed: Dec. 3, 2010

(65) Prior Publication Data

US 2011/0202721 A1   Aug. 18, 2011

Related U.S. Application Data

(60) Provisional application No. 61/303,844, filed on Feb. 12, 2010.

(51) Int. Cl.
*G06F 3/06* (2006.01)
*G06F 11/10* (2006.01)

(52) U.S. Cl.
CPC ...... *G06F 11/1076* (2013.01); *G06F 2211/105* (2013.01)
USPC ........................................................ 711/114

(58) Field of Classification Search
None
See application file for complete search history.

(56) References Cited

U.S. PATENT DOCUMENTS

| | | | | |
|---|---|---|---|---|
| 5,129,088 A | * | 7/1992 | Auslander et al. | 711/1 |
| 5,502,836 A | * | 3/1996 | Hale et al. | 711/170 |
| 5,551,003 A | * | 8/1996 | Mattson et al. | 711/136 |
| 5,696,934 A | * | 12/1997 | Jacobson et al. | 714/5.11 |
| 5,758,050 A | * | 5/1998 | Brady et al. | 714/1 |
| 6,757,753 B1 | * | 6/2004 | DeKoning et al. | 710/38 |
| 7,200,715 B2 | * | 4/2007 | Kleiman et al. | 711/114 |
| 7,346,831 B1 | | 3/2008 | Corbett | |
| 2002/0194427 A1 | * | 12/2002 | Hashemi | 711/114 |
| 2005/0257083 A1 | * | 11/2005 | Cousins | 714/6 |

OTHER PUBLICATIONS

Raid Recovery Labs, "Non-Standard Raid Levels," 2007 [retrieved on Jul. 9, 2010]. Retrieved from the Internet: <URL: http://www.raidrecoverylabs.com/non_standard_raid_levels/>.

* cited by examiner

*Primary Examiner* — Duc Doan
(74) *Attorney, Agent, or Firm* — Haynes and Boone, LLP (57) ABSTRACT

A data storage system includes three or more storage devices, each associated with a unique data volume. A first one of the data storage devices at least has two or more data storage areas but can have more storage areas, which can be either data storage areas or parity storage areas. A second data storage device at least has two storage areas, one of which is a data storage area. A third data storage device at least has a parity storage area but can have more storage areas, which can be either data storage areas or parity storage areas. A first group of corresponding storage areas is defined by at least the data storage areas of the first and second storage devices and the parity storage area of the third storage device. A second group of corresponding storage areas is defined by at least the storage areas of the first and second storage devices. When a data segment is written to one of the data storage areas of a storage device, parity information can be updated using information read from one or more storage areas of the group of corresponding storage areas having the data storage area to which the data segment is written.

17 Claims, 7 Drawing Sheets

REDUNDANT ARRAY OF INDEPENDENT STORAGE

CROSS-REFERENCE TO RELATED PATENT APPLICATION

The benefit of the filing date of U.S. Provisional Patent Application Ser. No. 61/303,844, filed Feb. 12, 2010, entitled "REDUNDANT ARRAY OF INDEPENDENT STORAGE," is hereby claimed and the disclosure thereof incorporated herein in its entirety by this reference.

TECHNICAL FIELD OF THE INVENTION

The invention relates generally to data storage systems and, more specifically, to data storage systems having redundancy to promote data storage reliability.

BACKGROUND OF THE INVENTION

A typical data storage system includes one or more arrays of magnetic disk drives or similar non-volatile storage devices, and a controller that controls the manner and locations in which data is stored in and retrieved from the devices. It is important that a host system be able to reliably access all of the data in the data storage system. However, a potential problem that affects data storage systems is that one or more of the devices can fail or malfunction in a manner that prevents the host system from accessing some or all of the data stored on that device.

Figure 1:
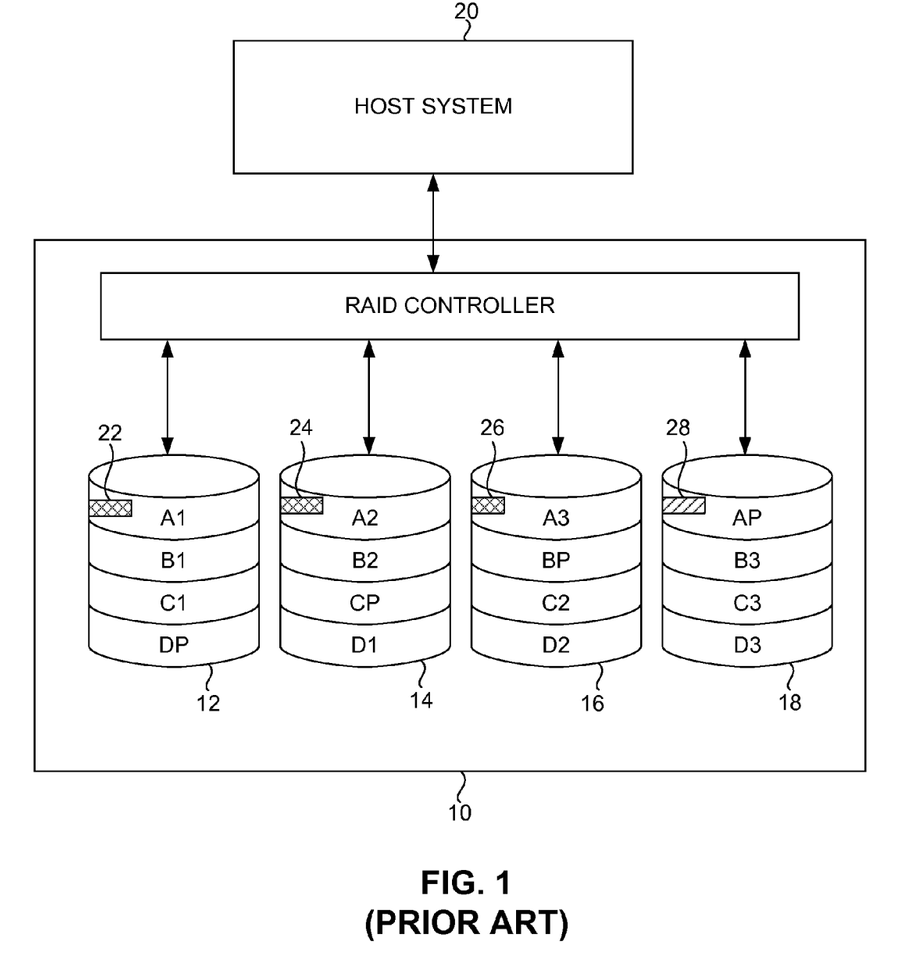
FIG. 1 is a block diagram of a data storage system in accordance with the prior art.

A redundant array of inexpensive (or independent) disks (RAID) is a common type of data storage system that addresses the above-referenced reliability problem by enabling recovery from the failure of one or more storage devices. Various RAID schemes are known. The various RAID schemes are commonly referred to by a "level" number, such as "RAID-0," "RAID-1," "RAID-2," etc. For example, as illustrated in FIG. 1, a conventional RAID-5 system 10 can have, for example, four storage devices 12, 14, 16 and 18 (e.g., arrays of disk drives) with, for example, three logical volumes A, B and C, where each logical volume is divided into three storage areas. In RAID-5 storage system 10, data is distributed across storage devices 12, 14, 16 and 18, with parity information for the data distributed among storage devices 12, 14, 16 and 18 as well. Distributing logically sequential data segments across multiple storage devices is known as striping. For example, in response to a request received from a host system 20 to write data to volume A, RAID-5 system 10 distributes logically sequential data segments 22, 24, 26, etc., across corresponding storage areas A1, A2 and A3 in storage devices 12, 14 and 16, respectively, then computes parity information for data segments 22, 24 and 26 and stores the resulting parity information 28 in another corresponding storage area in storage device 18. In performing striping, the granularity is typically relatively small, meaning that in the vast majority of instances in which a write operation is requested, the data to be written is divided into many data segments (of typically only a few kilobytes each) and written across many corresponding storage devices.

System 10 is depicted in FIG. 1 using a conventional RAID notation or symbology in which each storage area is represented by a disk-like symbol, but it is understood that the symbol represents a logical element and not a physical disk. Also, the corresponding storage areas across which logically sequential data segments are striped is commonly referred to as a "layer," which is another logical construct. For purposes of clarity, each logical volume is shown in FIG. 1 as having only a single layer. Nevertheless, each logical volume commonly has many layers.

Note that each of the four storage devices 12, 14, 16 and 18 includes only a portion of three of the four logical volumes as well as parity information for the fourth logical volume. The parity information for volume A or AP is the exclusive-OR (XOR) of the data stored in storage areas A1, A2 and A3, i.e., AP=A1 XOR A2 XOR A3. The parity information for volume B or BP is the exclusive-OR of the data stored in storage areas B1, B2 and B3, i.e., Bp=B1 XOR B2 XOR B3. The parity information for volume C or CP is the exclusive-OR of the data stored in storage areas C1, C2 and C3, i.e., CP=C1 XOR C2 XOR C3. The parity information for volume D or DP is the exclusive-OR of the data stored in storage areas D1, D2 and D3, i.e., DP=D1 XOR D2 XOR D3. Thus, if any one of storage devices 12, 14, 16 and 18 fails, it is possible to reconstruct the data or parity information that was stored on the failed device from the corresponding data and parity information stored on the other three devices. For example, if storage device 14 fails, it is possible to reconstruct the data in storage area A2 by computing the exclusive-OR of A1, A3 and AP.

It should be noted that the storage areas in each of storage devices 12, 14, 16 and 18 are typically physically contiguous. That is, storage areas A1, B1, C1 and DP are physically contiguous on storage device 12; storage areas A2, B2, CP and D1 are physically contiguous on storage device 14; storage areas A3, BP, C2 and D2 are physically contiguous on storage device 16; and storage areas AP, B3, C3 and D3 are physically contiguous on storage device 18. Physically contiguous storage areas commonly comprise physically adjacent sectors on a disk.

Mirroring is another technique for addressing the above-referenced reliability problem. In mirroring, data is duplicated among more than one storage device. That is, the same data (and parity) are stored on two or more storage devices. In some instances, mirroring has been combined with RAID principles. For example, RAID-1 includes mirroring instead of striping. Hybrid RAID schemes known as RAID-0+1 and RAID-1+0 combine mirroring and striping techniques.

A disadvantage of the above-described RAID-5 scheme and similar schemes in which data is striped across multiple storage devices is that if one of the storage devices fails, the failure affects all of the volumes. Thus, in the event of failure of even one storage device, it is generally necessary to reconstruct at least some of the data before a read request from the host system can be properly performed.

Another disadvantage of the above-described RAID-5 scheme is that all of the storage devices of the data storage system must have the same capacity as each other, due to striping. Still another disadvantage of the above-described RAID-5 scheme is that, to increase storage capacity by adding new storage devices, data and parity information must be redistributed among the increased set of devices, since parity information is embedded within the otherwise physically contiguous data. Also, although RAID-5 is capable of recovering from failure of a single storage device, and RAID-6 is capable of recovering from failure of two storage devices, recovery from failure of more than two storage devices is generally not possible with conventional RAID schemes.

A redundant array of independent servers (RAIS), also known as a redundant array of independent nodes (RAIN), is another type of data storage system that addresses the reliability problem. In a RAIS system, each storage device resides on an independent server computer. The servers are interconnected to each other by a network. Striping and other RAID methodologies are typically employed in a RAIS system. A disadvantage of the RAIS scheme is that system performance is adversely affected during rebooting of any one of more of the servers, which can be a relatively frequent occurrence in a large RAIS system.

SUMMARY

Embodiments of the invention relate to a data storage system comprising three or more storage devices, in which each of three storage devices is associated with a unique data volume. A first one of the three data storage devices has at least has two data storage areas but can have more storage areas, which can be either data storage areas or parity storage areas. A second one of the three data storage devices has at least two storage areas, one of which is a data storage area, but can have more storage areas, which can be either data storage areas or parity storage areas. A third one of the three data storage devices has at least a parity storage area, but can similarly have more storage areas. A first group of corresponding storage areas is defined by at least the data storage areas of the first and second storage devices and the parity storage area of the third storage device. A second group of corresponding storage areas is defined by at least the storage areas of the first and second storage devices.

In an exemplary embodiment, each data storage device is associated with a corresponding server that has a processor system for controlling the associated data storage device. The servers are interconnected to each other via a data network. Thus, any one of the servers can respond to a write request or read request that is initiated by another one of the servers or by a host system connected to the data network.

In response to receiving a write request, a processing system can cause the data segment to be written to one of the data storage areas of the storage device corresponding to the indicated data volume. Parity information can be generated using information read from one or more storage areas of the group of corresponding storage areas having the data storage area to which the data segment is written. The parity storage area of the group of corresponding storage areas having the data storage area to which the data segment is written can be updated with the generated parity information. Read requests can be processed in a similar manner, though parity information is not involved. It can be noted that in the event that one of the storage devices fails, no data need be reconstructed in order for read requests to any of the other storage devices to be processed successfully.

DETAILED DESCRIPTION OF AN ILLUSTRATIVE EMBODIMENT

Figure 2:
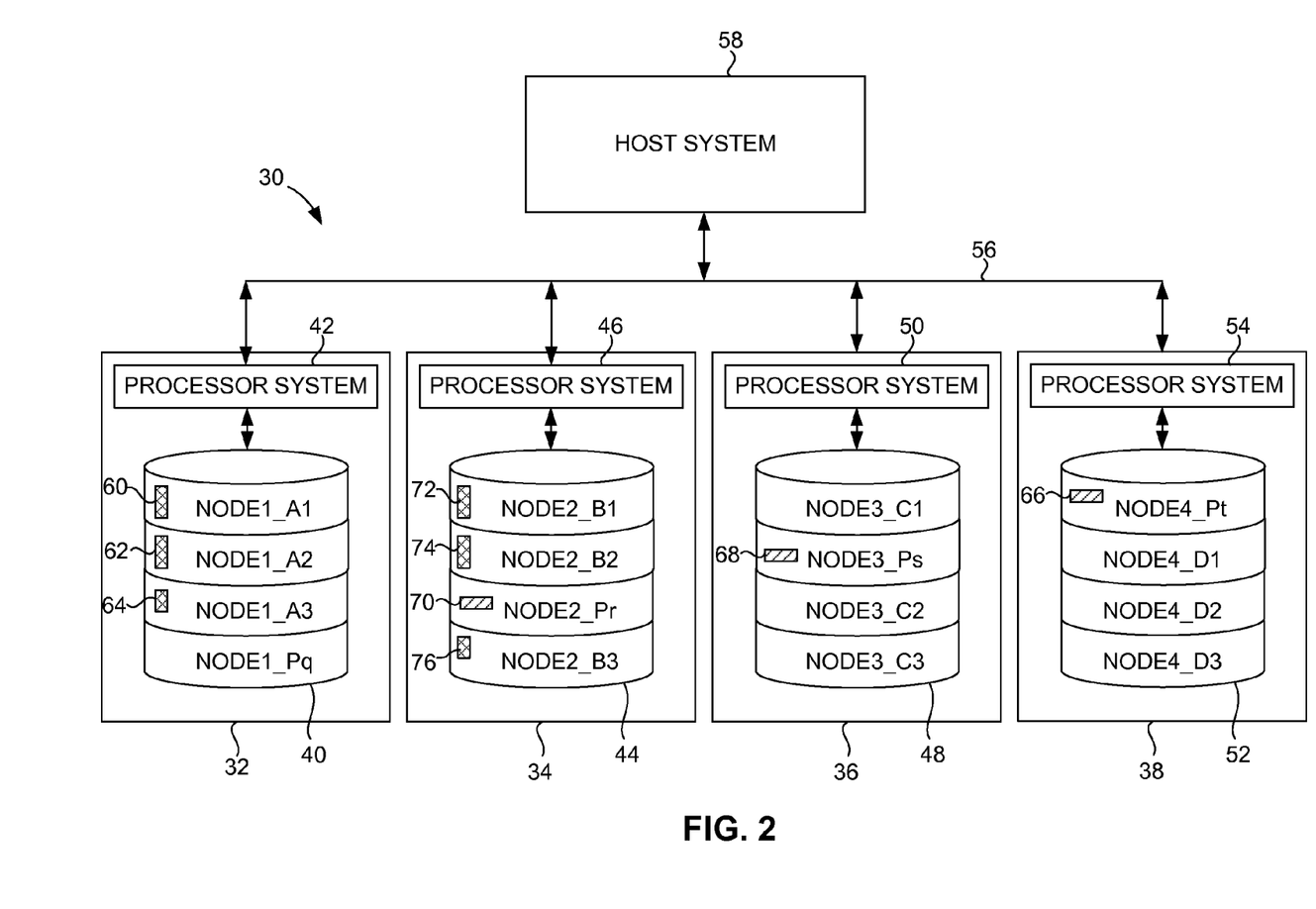
FIG. 2 is a block diagram of a data storage system having a configuration in accordance with an exemplary embodiment of the present invention.

As illustrated in FIG. 2, in an illustrative or exemplary embodiment of the invention, a data storage system 30 includes servers 32, 34, 36 and 38. Although in the illustrated embodiment data storage system 30 includes four servers 32-38, in other embodiments a data storage system can have any suitable number (n) of servers (also referred to as nodes). The number four serves only as an example. Server 32 includes a storage device 40 (e.g., an array of disk drives) and a processor system 42 that controls storage device 40. Server 34 includes a storage device 44 (e.g., an array of disk drives) and a processor system 46 that controls storage device 44. Server 36 includes a storage device 48 (e.g., an array of disk drives) and a processor system 50 that controls storage device 48. Server 38 includes a storage device 52 (e.g., an array of disk drives) and a processor system 54 that controls storage device 52. Storage devices 40, 44, 48 and 52 are coupled to their respective processor systems 42, 46, 50 and 54, which are in turn coupled via a data network 56 to each other and to a host system 58. Although for purposes of clarity in the illustrated embodiment processor systems 42, 46, 50 and 54 are included within servers 32, 34, 36 and 38, respectively, in other embodiments the processor systems can be located remotely from the storage devices they control.

In the illustrated embodiment, each of storage devices 40, 44, 48 and 52 corresponds to a unique data volume A, B, C and D, respectively. Each of storage devices 40, 44, 48 and 52 has three data storage areas and a parity storage area. More specifically: storage device 40 has data storage areas NODE1_A1, NODE1_A2 and NODE1_A3 and parity storage area NODE1_Pq; storage device 44 has data storage areas NODE2_B1, NODE2_B2 and NODE2_B3 and parity storage area NODE2_Pr; storage device 48 has data storage areas NODE3_C1, NODE3_C2 and NODE3_C3 and parity storage area NODE3_Ps; and storage device 52 has data storage areas NODE4_D1, NODE4_D2 and NODE4_D3 and parity storage area NODE4_Pt.

In the illustrated embodiment, each of the data storage areas in each of storage devices 40, 44, 48 and 52 corresponds to one storage area in each of the other storage devices and to one parity storage area in one of the other storage devices: data storage areas NODE1_A1, NODE2_B1, NODE3_C1 and parity storage area NODE4_Pt all mutually correspond to each other and define a first group of storage areas; data storage areas NODE1_A2, NODE2_B2 and NODE4_D1 and parity storage area NODE3_Ps all mutually correspond to each other and define a second group of storage areas; data storage areas NODE1_A3, NODE3_C2 and NODE4_D2 and parity storage area NODE2_Pr all mutually correspond to each other and define a third group of storage areas; and data storage areas NODE2_B3, NODE3_C3 and NODE4_D3 and parity storage area NODE1_Pq all mutually correspond to each other and define a fourth group of storage areas. Thus, the parity information for a group of corresponding storage areas is stored in the one of the storage devices 40, 44, 48 and 52 that includes the corresponding parity storage area for that group. For example, the parity information for the group of corresponding storage areas NODE1_A2, NODE2_B2 and NODE4_D1 is stored in parity storage area NODE3_Ps in storage device 48. The indices q, r, s and t in the parity storage area names are not significant but comprise a set of different letters to indicate that the parity information is different for each group of corresponding storage areas.

Each parity storage area stores parity information generated from data stored in the group of mutually corresponding data storage areas in which the parity storage area is included (or of which the parity storage area defines a portion). Parity information can be generated by, for example, forming the exclusive-OR (XOR) of the data stored in the mutually corresponding storage areas of all of the storage devices:

NODE4_Pt=(NODE1_A1) XOR (NODE2_B1) XOR (NODE3_C1);
NODE3_Ps=(NODE1_A2) XOR (NODE2_B2) XOR (NODE4_D1);
NODE2_Pr=(NODE1_A3) XOR (NODE3_C2) XOR (NODE4_D2); and
NODE1_Pq=(NODE2_B3) XOR (NODE3_C3) XOR (NODE4_D3).

Any of servers 32, 34, 36 and 38 can initiate a memory access operation, i.e., a write operation or a read operation, upon any other server 32, 34, 36 or 38. Host system 58 can also initiate such a memory access operation upon any of servers 32, 34, 36 or 38. Initiating a read operation includes providing a read request via network 56 that indicates a logical volume address in one of logical volumes A, B, C or D and the amount of data (e.g., number of bytes) to be read beginning at that address. Initiating a write operation includes providing a write request via network 56 that indicates the data to be written and a logical volume address at which the data is to begin being written.

In response to initiation of a read operation, the one of servers 32-38 that corresponds to the logical volume indicated in the read request reads the requested amount of data from logically sequential addresses beginning at the indicated address and transmits the data to the requestor (i.e., one of servers 32-38 or host system 58) via network 56.

In response to initiation of a write operation, the one of servers 32, 34, 36 and 38 that corresponds to the logical volume indicated in the write request divides the data to be written into segments and writes the data to its respective storage device 40, 44, 48 or 52 under the control of its respective processor system 42, 46, 50 or 54. For example, n response to a write operation to a logical volume address in volume A, processor system 42 writes logically sequential data segments 60, 62 and 64 of the data to volume A by writing each of data segments 60, 62 and 64 to a corresponding one of the data storage areas NODE1_A1, NODE1_A2 and NODE1_A3 of storage device 40. Although for purposes of clarity each of storage devices 40, 44, 48 and 52 is shown as corresponding to only one volume, it should be understood that a storage device can be associated with more than one volume. For example, in a storage device the data storage areas of a second volume can be located after the data storage areas of a first volume.

In association with the write operation, parity information is updated. Although various ways of updating parity information will occur to those skilled in the art in view of the descriptions and examples herein, the following is one suitable method. In this exemplary method, processor systems 42, 46, 50 and 54 of servers 32, 34, 36 and 38, respectively, operate in coordination with each other to update the parity information. Processor system 42 can read the previous or old data from data storage area NODE1_A1 prior to writing data segment 60 to data storage area NODE1_A1 and generate the exclusive-OR of the old data and data segment 60 to form an intermediate result. Processor system 42 can send the intermediate result to server 38, where processor system 54 can complete the updating of parity storage area NODE4_Pt. Processor system 54 can read the previous or old parity information from parity storage area NODE4_Pt and generate the exclusive-OR of the old parity information with the received intermediate result to form updated parity information 66. Processor system 54 can then store the updated parity information 66 in parity storage area NODE4_Pt in place of the previous or old parity information.

Likewise, processor system 42 can read the previous or old data from data storage area NODE1_A2 prior to writing data segment 62 to data storage area NODE1_A2 and generate the exclusive-OR of the old data and data segment 62 to form an intermediate result. Processor system 42 can send this intermediate result to server 36, where processor system 50 can complete the updating of parity storage area NODE3_Ps. Processor system 50 can read the previous or old parity information from parity storage area NODE3_Ps and generate the exclusive-OR of the old parity information with the received intermediate result to form updated parity information 68. Processor system 50 can then store the updated parity information 68 in parity storage area NODE3_Ps in place of the previous or old parity information.

Similarly, processor system 42 can read the previous or old data from data storage area NODE1_A3 prior to writing data segment 64 to data storage area NODE1_A3 and generate the exclusive-OR of the old data and data segment 64 to form an intermediate result. Processor system 42 can send this intermediate result to server 34, where processor system 46 can complete the updating of parity storage area NODE2_Pr. Processor system 46 can read the previous or old parity information from parity storage area NODE2_Pr and generate the exclusive-OR of the old parity information with the received intermediate result to form updated parity information 70. Processor system 46 can then store the updated parity information 70 in parity storage area NODE2_Pr in place of the previous or old parity information.

In another exemplary instance, in response to a write operation to a logical volume address in volume B, processor system 46 writes logically sequential data segments 72, 74 and 76 of the data to volume B by writing each of data segments 72, 74 and 76 to a corresponding one of the data storage areas NODE2_B1, NODE2_B2 and NODE2_B3 of storage device 44. Although in both of these examples (i.e., the above-described write operation to a logical volume address in volume A and this write operation to a logical volume address in volume B) three data segments are written, in other instances any other suitable number of one or more data segments can be written. The number three in these examples is of no significance and is used only for purposes of illustration.

In this example, processor system 46 can read the previous or old data from data storage area NODE2_B1 prior to writing data segment 72 to data storage area NODE2_B1 and generate the exclusive-OR of the old data and data segment 72 to form an intermediate result. Processor system 46 can send the intermediate result to server 38, where processor system 54 can complete the updating of parity storage area NODE4_Pt. Processor system 54 can read the previous or old parity information from parity storage area NODE4_Pt and generate the exclusive-OR of the old parity information with the received intermediate result to form updated parity information 66. Processor system 54 can then store the updated parity information 66 in parity storage area NODE4_Pt in place of the previous or old parity information.

Likewise, processor system 46 can read the previous or old data from data storage area NODE2_B2 prior to writing data segment 74 to data storage area NODE2_B2 and generate the exclusive-OR of the old data and data segment 74 to form an intermediate result. Processor system 46 can send this intermediate result to server 36, where processor system 50 can complete the updating of parity storage area NODE3_Ps. Processor system 50 can read the previous or old parity information from parity storage area NODE3_Ps and generate the exclusive-OR of the old parity information with the received intermediate result to form updated parity information 68. Processor system 50 can then store the updated parity information 68 in parity storage area NODE3_Ps in place of the previous or old parity information.

Similarly, processor system 46 can read the previous or old data from data storage area NODE2_B3 prior to writing data segment 76 to data storage area NODE2_B3 and generate the exclusive-OR of the old data and data segment 76 to form an intermediate result. In this instance, processor system 46 can complete the updating of parity storage area NODE2_Pr without sending the intermediate result to another server because parity storage area NODE2_Pr of storage device 44 is in the same server 34 as processor system 46. Accordingly, processor system 46 reads the previous or old parity information from parity storage area NODE2_Pr and generates the exclusive-OR of the old parity information with the intermediate result to form updated parity information 70. Processor system 46 can then store the updated parity information 70 in parity storage area NODE2_Pr in place of the previous or old parity information.

It should be noted that if any one of servers 32, 34, 36 and 38 fails, the parity scheme described herein enables full reconstruction of data residing on the failed server. Indeed, even if two of servers 32, 34, 36 and 38 fail, it is possible to continue accessing data residing on any of the other servers that remain operational, though parity protection will be compromised until at least one of the two failed servers is replaced or made operational. For example, if server 34 fails, the failure only adversely affects accessing the data of volume B. Host system 58 or other servers that remain operational can still access volumes A, C and D on servers 32, 36 and 38, respectively. Similarly, during rebooting of any one or more of servers 32, 34, 36 and 38, host system 58 or other servers that remain operational can still access data volumes on the servers that remain operational. Unlike, for example, the RAID-5 scheme, in an embodiment of the present invention the data of a failed storage device does not need to be reconstructed in order for other volumes to continue being accessed normally. In embodiments of the present invention, in an instance in which only a single server fails, the data volume of the failed server can be reconstructed. For example, in an instance in which server 34 fails, the (volume B) data and parity information stored on storage device 44 can be reconstructed and stored as follows: compute the exclusive-OR of the data in data storage areas NODE1_A1, NODE2_C1 and the parity information in parity storage area NODE4_Pt and store the result in data storage area NODE2_B1; compute the exclusive-OR of the data in data storage areas NODE1_A2 and NODE4_D1 and the parity information in parity storage area NODE3_Ps and store the result in data storage area NODE2_B2; compute the exclusive-OR of the data in data storage areas NODE1_A3, NODE2_C2 and NODE4_D2 and store the result in parity storage area NODE2_Pr; and compute the exclusive-OR of the parity information in parity storage area NODE1_Pq and the data in data storage areas NODE3_C3 and NODE4_D3 and store the result in data storage area NODE2_B3.

Figure 3:
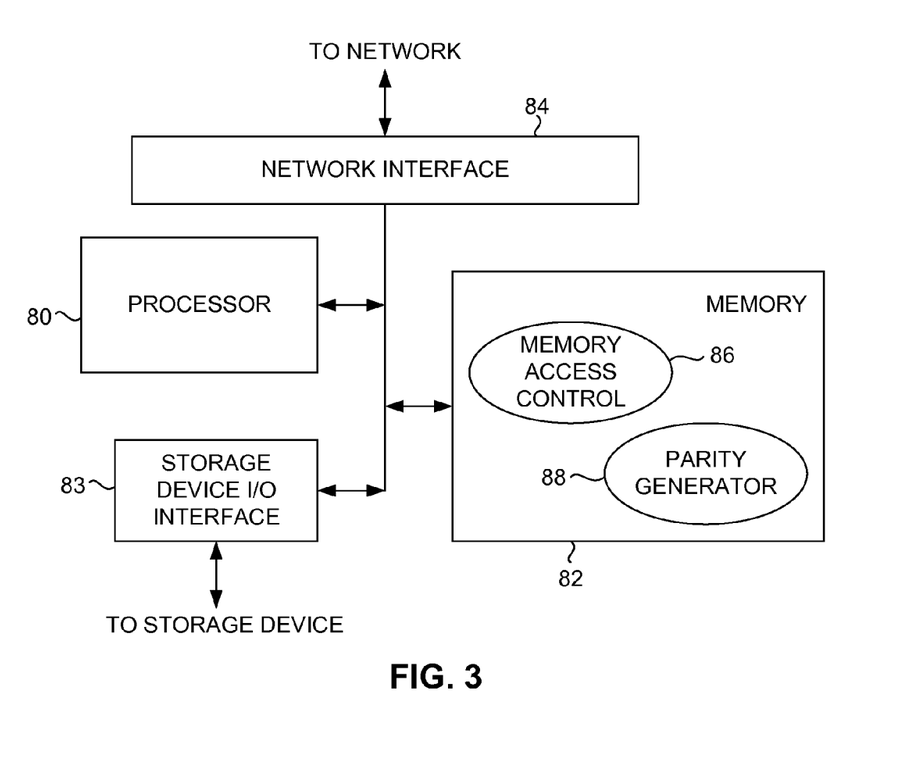
FIG. 3 is a block diagram of a processor system of the data storage system of FIG. 2.

Although each of processor systems 42, 46, 50 and 54 can have any suitable structure or architecture that enables it to control or otherwise effect the functions described herein, FIG. 3 illustrates an exemplary structure in which the functions are performed at least in part under the control of software elements. The combination of such software or firmware elements and the hardware elements with which they interact constitutes a programmed processor system 42, 46, 50 or 54 that is programmed or configured to effect the functions or methods of operation described herein. In the exemplary embodiment, at least a processor 80 or similar device, suitable memory 82, a storage device input/output (I/O) interface 83, and a network interface 84 are included in each of processor systems 42, 46, 50 and 54. Although memory 82 is shown for purposes of clarity as a single or unitary element, it should be understood that memory 82 can include memory devices of any suitable type and number, including, for example, non-volatile memory such as FLASH memory, (volatile) random-access memory, etc. Similarly, processor 80 can include one or more devices. Although not shown for purposes of clarity, each of processor systems 42, 46, 50 and 54 can further include other hardware or software elements of the types that are generally included in computer processor systems.

Each of processor systems 42, 46, 50 and 54 is programmed (i.e., through software) to effect the methods described herein, such as the memory access operations and parity updating operations described above. Such programming can include memory access software (code) 86 and parity generation software (code) 88. For example, memory access software 86 can effect aspects of receiving a write request and writing the received data to a storage device in the form of data segments. Memory access software 86 can also effect aspects of receiving a read request and reading the requested data from a storage device. Parity generation software 88 can effect generating parity information using information read from one or more storage areas in conjunction with memory access software 86. Memory access software 86 and parity generation software 88 are depicted in FIG. 3 as separate and distinct for purposes of illustration but can be organized in any suitable manner, including being combined with each other or with other elements, divided into additional elements, etc. Also, although memory access software 86 and parity generation software 88 are depicted for purposes of illustration as stored in or residing in memory 82, as persons skilled in the art to which the invention relates understand, such software elements may not reside simultaneously or in their entireties in memory 82 or other such storage medium. Rather, in accordance with conventional computing principles, such software elements can be retrieved into memory 82 in portions (e.g., instructions, code segments, files, libraries, etc.) on an as-needed basis from one or more suitable sources, such as portions (not shown) of storage devices 40, 44, 48 and 52 or other storage devices, via network 56 from a remote device, etc. It should be noted that the combination of one or more of above-described software elements or portions thereof and memory 82 or other computer-readable medium on which they are recorded constitutes a "computer program product" as that term is used in the patent lexicon.

Figure 4:
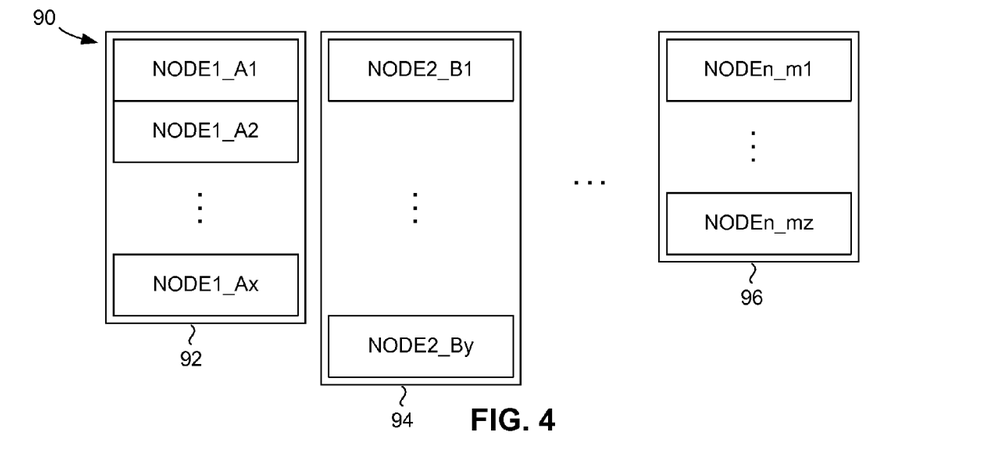
FIG. 4 is a block diagram similar to FIG. 2, illustrating the configuration of the data storage system in a more generalized manner.

A simplified notation is introduced in FIG. 4, which depicts a generalized data storage system 90 that includes storage devices 92, 94, 96, etc., but for purposes of clarity does not show the associated processor systems or servers (i.e., nodes) or the data network. Nevertheless, data storage system 90 includes all of the features and elements described above with regard to the four-server exemplary embodiment shown in FIG. 2. Thus, storage devices 92, 94, 96, etc., are included within corresponding servers or nodes that are interconnected via a data network.

In the notation shown in FIG. 4, storage device 92, which represents the "first" storage device in data storage system 90, includes data storage areas NODE1_A1 through NODE1_Ax, where "x" is an index number greater than one and represents the number of data storage areas in the "first" storage device 92 of an embodiment. NODE1_A1 is the "first" data storage area, NODE1_A2 is the "second" data storage area, etc. Storage device 92 corresponds to the "first" data volume and can be referred to as volume A. Nevertheless, the letters "A", "B", "C", etc., used herein to denote data volumes have no significance and are used only for convenience of description. The ellipsis (" . . . ") symbol indicates additional data storage areas that are not shown.

Likewise, storage device 94, which represents the "second" storage device in data storage system 90, includes data storage areas NODE2_B1 through NODE2_By, where "y" is an index number greater than one and represents the number of data storage areas in the second storage device 94 of an embodiment. Storage device 94 corresponds to the "second" data volume of data storage system 90 and can be referred to as volume B. Note that data storage system 90 includes at least storage devices 92, 94 and 96 (i.e., at least three storage devices), but can include additional storage devices that are not shown but are indicated by the ellipsis symbol between storage devices 94 and 96.

Similarly, storage device 96, which represents the "last" or nth storage device in data storage system 90, includes data storage areas NODEn_m1 through NODEn_mz, where "n" is an index number greater than or equal to three that represents the number of storage devices in data storage system 90, "m" represents the identity of the last data volume (i.e., the last in the set A, B, C, etc.) in data storage system 90, and "z" is an index number greater than one that represents the number of data storage areas in the last or nth storage device. Note that x, y and z are different from each other to emphasize that the various storage devices of data storage system 90 need not have the same number of storage areas or otherwise have the same storage capacity. This differs from a conventional RAID system, such as that shown in FIG. 1, in which all storage devices must have the same number of storage areas.

It should be understood that the terms "first," "second," "third," etc., are not intended to imply an order or sequence to, or relative locations of, storage areas or any other elements of the embodiment with respect to each other. For example, unless otherwise specified, the "first" data storage area of a storage device can be physically located anywhere in the storage device and logically located anywhere in the storage device. Furthermore, it should be understood that the terms "first," "second," "third," etc., are not intended to imply total numbers of elements. For example, in an embodiment, the first, second and third storage devices can be included among (i.e., a subset of) a greater number of storage devices and can be physically or logically located anywhere with respect to the other storage devices.

Figure 5:
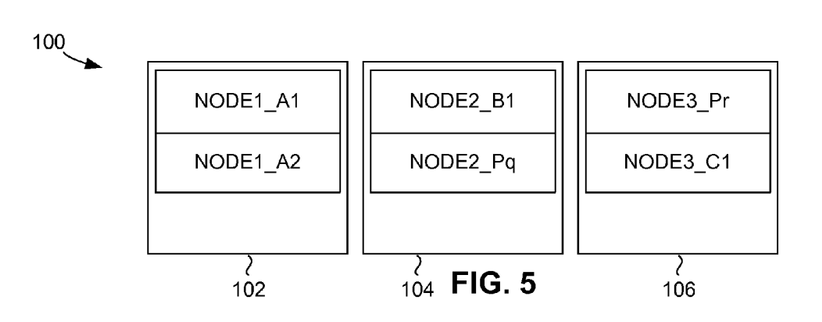
FIG. 5 is a block diagram similar to FIG. 2, illustrating a data storage system having a configuration comprising three storage devices.

As illustrated in FIG. 5, an exemplary data storage system 100 of the type described above can include a first storage device 102 corresponding to a first data volume, a second storage device 104 corresponding to a second data volume, and a third storage device 106 corresponding to a third data volume. First storage device 102 includes two storage areas: a first data storage area NODE1_A1 and a second data storage area NODE1_A2. Second storage device 104 includes two storage areas: a first data storage area NODE2_B1 and a parity storage area NODE2_Pq. Third storage device 106 includes two storage areas: a parity storage area NODE3_Pr and a first data storage area NODE3_C1. Storage areas NODE1_A1, NODE2_B1 and NODE3_Pr together define a first group of corresponding storage areas. Storage areas NODE1_A2, NODE2_Pq and NODE3_C1 together define a second group of corresponding storage areas. Data storage system 100 operates in the same manner described above with regard to the embodiment shown in FIG. 2. That is, parity information stored in parity storage area NODE3_Pr protects or enables the reconstruction of data stored in data storage areas NODE1_A1 and NODE2_B1, i.e., data storage areas in the same group as NODE3_Pr, in the event that one of storage devices 102 and 104 fails. Likewise, parity information stored in parity storage area NODE2_Pq protects or enables the reconstruction of data stored in data storage areas NODE1_A2 and NODE3_C1, i.e., data storage areas in the same group as NODE2_Pq, in the event that one of storage devices 102 and 106 fails. Note that not all of the storage devices in data storage system 100 need include both parity and data. Rather, a storage device can include only parity and no data, or only data and no parity. For example, storage device 102 includes only data storage areas and no parity storage areas.

Figure 6:
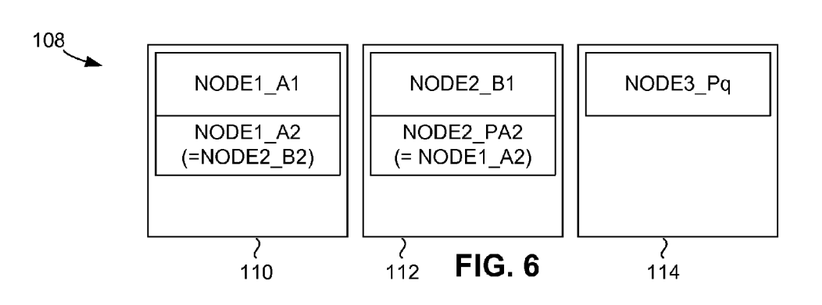
FIG. 6 is a block diagram similar to FIG. 4, illustrating an alternative configuration in which two storage areas are mirrored.

As illustrated in FIG. 6, another exemplary data storage system 108 of the type described above can include a first storage device 110 corresponding to a first data volume, a second storage device 112 corresponding to a second data volume, and a third storage device 114 corresponding to a third data volume. First storage device 110 includes two storage areas: a first data storage area NODE1_A1 and a second data storage area NODE1_A2. Second storage device 112 includes two storage areas: a first data storage area NODE2_B1 and a parity storage area NODE2_PA2. Third storage device 114 includes only one storage area, which is a parity storage area NODE3_Pq. Storage areas NODE1_A1, NODE2_B1 and NODE3_Pq together define a first group of corresponding storage areas. Storage areas NODE1_A2 and NODE2_PA2 together define a second group of corresponding storage areas. Parity storage area NODE2_PA2 is different from the parity storage areas described above with regard to other embodiments because the second group of corresponding storage areas consists of only two storage areas. In an instance in which a group consists of only two storage areas, a form of mirroring is employed. That is, the two storage areas are made to store the same data as each other. In data storage system 108, parity storage area NODE2_PA2 stores a copy of the data that is stored in NODE1_A2. Although in this instance the term "parity" is used differently from the manner in which it is used in other embodiments, the term is used to emphasize that the data stored in the parity storage area NODE2_PA2 of storage device 112 does not belong to the same data volume (volume B) as the data stored in storage device 112. In the notation used herein, the "PA2" of "NODE2_PA2" denotes a parity (P) storage area in which a copy of the data of a storage area (A2) of another storage device is stored. In the event that storage device 110 fails, the mirroring provided by parity storage area NODE2_PA2 enables reconstruction or preservation of the data.

Figure 7:
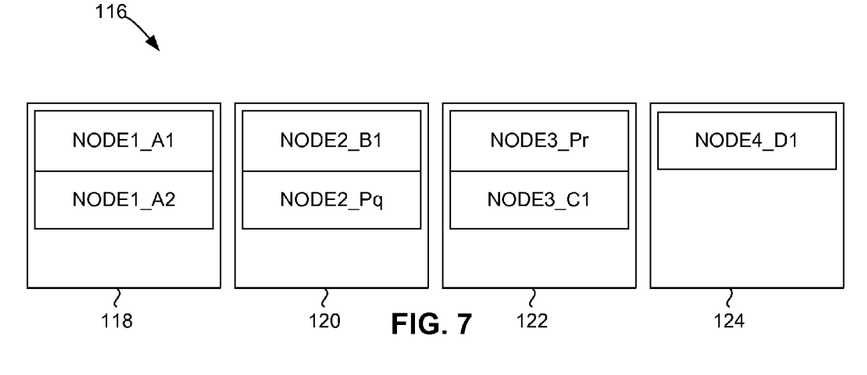
FIG. 7 is a block diagram similar to FIG. 4, illustrating an alternative configuration in which a fourth storage device has been added.

As illustrated in FIG. 7, an exemplary data storage system 116 similar to that described above with regard to FIG. 5 can include a first storage device 118 corresponding to a first data volume, a second storage device 120 corresponding to a second data volume, and a third storage device 122 corresponding to a third data volume. At any suitable time, a fourth storage device 124 corresponding to a fourth data volume can be added to data storage system 116. Although not shown for purposes of clarity, each of storage devices 118, 120, 122 and 124 is included within a server of the type described above. Accordingly, each of storage devices 118, 120, 122 and 124 includes a processor system, and each server is coupled to a data network that interconnects the servers. The fourth server in which fourth storage device 124 is included can be similarly coupled to the network at the time the fourth server is added to data storage system 116. Note that fourth storage device 124 includes only a data storage area NODE4_D1 and does not include any parity storage area. Thus, the data storage capacity of data storage system 116 can be expanded. Unlike an instance in which another storage device is added to a conventional RAID system, adding fourth storage device 124 does not require rearrangement of any data residing on storage devices 118, 120 and 122 at the time that fourth storage device 124 is added. Likewise, in embodiments of the invention, a storage device having no parity information can be removed from the system at any time without requiring rearrangement of any data residing on the remaining storage devices.

Parity information can be updated at the time that fourth data storage device 124 is added. As fourth storage device 124 includes only one storage area NODE4_D1, adding it to data storage system 116 potentially affects only one group of corresponding storage areas. The old parity information stored in parity storage area NODE3_Pr can be read, and the exclusive-OR of the old parity information and the data residing in data storage area NODE4_D1 can be formed. The resulting new or updated parity information can be stored in parity storage area NODE3_Pr in place of the old parity information.

Although not shown, in an instance in which a data storage system includes a group of corresponding storage areas that does not include a parity storage area, a server that includes a storage device having a parity storage area can be added to the data storage system. Thus, in an instance in which a group of data storage areas is not protected by parity information, a server can be added to the system to thereby provide parity protection to the previously unprotected data. Likewise, a server on which parity information is stored can be removed from the system if it is desired to remove parity protection from one or more groups. Also, in an instance in which a server having available storage space is already present at the time at which it is desired to add parity protection to a group, a parity storage area can be allocated, i.e., defined, on the storage device of that server, and the newly allocated parity storage area can be associated with the other storage areas of the group that the parity information is to protect. Similarly, if it is desired to remove parity protection from one of the groups, the parity storage area of the group can be de-associated from the remaining storage areas of the group. In such instances, adding or removing parity protection does not require rearranging any data.

Figure 8:
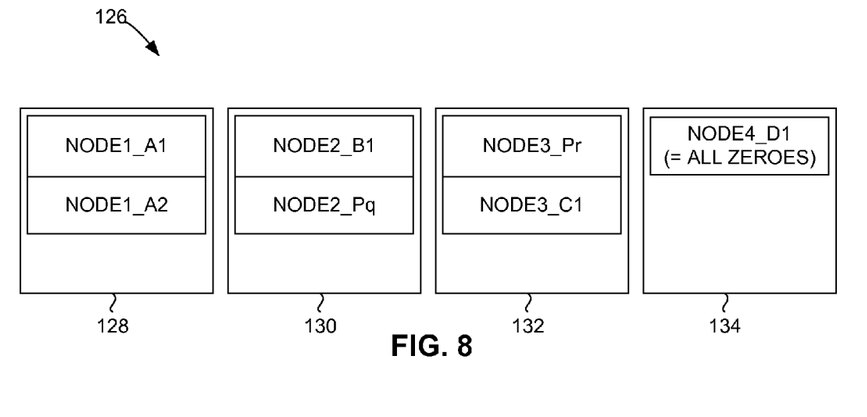
FIG. 8 is a block diagram similar to FIG. 6, illustrating another alternative configuration in which a fourth storage device has been added but the storage area of the fourth storage device has no data to preserve.

As illustrated in FIG. 8, in some instances, a new storage device (of a server) that is to be added to a data storage system 126 does not have any data residing on it that is to be preserved. For example, a fourth storage device 134 that is added to a system of first, second and third storage devices 128, 130 and 132, respectively, may have been initialized or cleaned such that the data residing on it consists of all zeroes. In the example shown in FIG. 8, fourth storage device 134 includes a data storage area NODE4_D1 that the data initially consists of "all zeroes." In that event, fourth storage device 134 can be added to data storage system 126 without updating any parity, because data consisting of all zeroes does not affect parity. Accordingly, it may be desirable in some embodiments to determine whether a new storage device (of a server) to be added to a data storage system has data stored on it that is to be preserved or has been (or may be) initialized or cleaned such that the data residing on it consists of all zeroes. Following this determination, parity is updated only if there is data to be preserved, thereby avoiding consuming system resources on updating parity when updating parity is not necessary.

Figure 9:
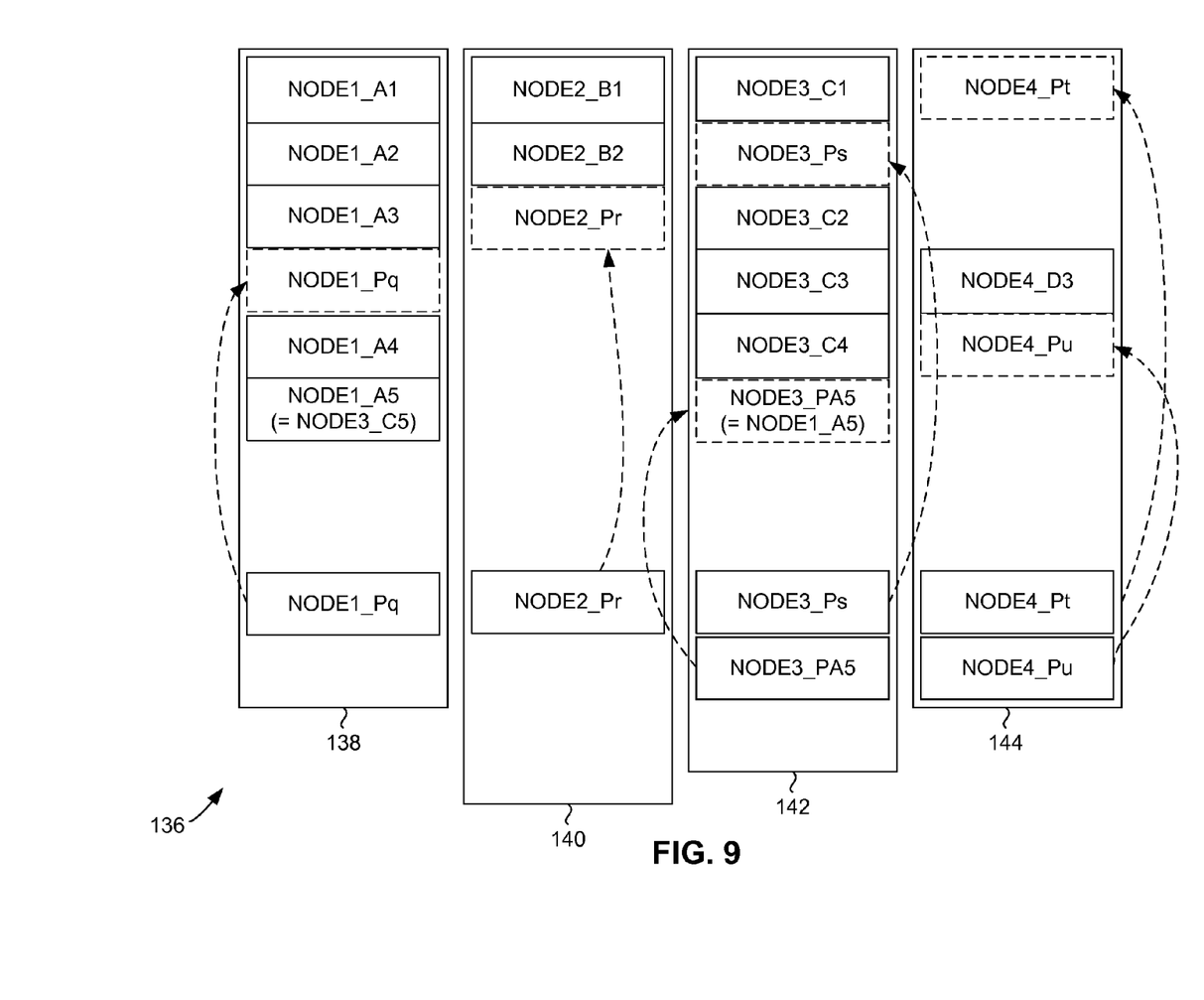
FIG. 9 is a block diagram illustrating another alternative configuration in which at least some of the parity storage areas are not physically located contiguously with the data storage areas and in which two storage areas are mirrored.

As illustrated in FIG. 9, another exemplary data storage system 136 can include a first storage device 138 corresponding to a first data volume, a second storage device 140 corresponding to a second data volume, a third storage device 142 corresponding to a third data volume, and a fourth storage device 144 corresponding to a fourth data volume. In embodiments such as that shown in FIG. 9, some of the parity storage areas are only logically contiguous with the data storage areas and not physically contiguous with the data storage areas.

For example, parity storage area NODE1_Pq of first storage device 138 is not physically contiguous with the data storage areas NODE1_A1, NODE1_A2, NODE1_A3, NODE1_A4 and NODE1_A5. Rather, parity storage area NODE1_Pq is physically located elsewhere on first storage device 138 and only logically located between data storage areas NODE1_A3 and NODE1_A4, as indicated by the broken-line arrow pointing from the physical location of parity storage area NODE1_Pq to the logical location of parity storage area NODE1_Pq. The data storage areas NODE1_A1, NODE1_A2, NODE1_A3, NODE1_A4 and NODE1_A5 are physically contiguous with each other in the illustrated embodiment. Although not shown for purposes of clarity, the processor system that controls first storage device 138 includes logic, such as a table or similar software structure, that represents or indicates the correspondence between the logical location of each parity storage area and the physical location of that parity storage area in first storage device 138. The processor system that controls first storage device 138 also includes logic, such as a table or similar software structure, that represents or indicates all of the groups of corresponding storage areas associated with first storage device 138, so that the processor system is able to determine, for example, that the parity storage area NODE1_Pq in first storage device 138, the data storage area NODE3_C3 in third storage device 142, and the data storage area NODE4_D3 together define a group of corresponding storage areas.

Similarly, parity storage area NODE2_Pr of second storage device 140 is not physically contiguous with the data storage areas NODE2_B1 and NODE2_B2. Rather, parity storage area NODE2_Pr is physically located elsewhere on second storage device 140 and only logically located adjacent to data storage areas NODE2_B2, as indicated by the broken-line arrow pointing from the physical location of parity storage area NODE2_Pr to the logical location of parity storage area NODE2_Pr. The data storage areas NODE2_B1 and NODE2_B2 are physically contiguous with each other in the illustrated embodiment. Although not shown for purposes of clarity, the processor system that controls second storage device 140 includes logic similar to that described above with regard to the processor system that controls first storage device 138. Accordingly, the processor system that controls second storage device 140 can determine the logical location of parity storage area NODE2_Pr and can determine the group of corresponding storage areas of which parity storage area NODE2_Pr defines a portion: NODE1_A3, NODE2_Pr and NODE3_C2.

In addition, parity storage area NODE3_Ps of third storage device 142 is not physically contiguous with the data storage areas NODE3_C1, NODE3_C2, NODE3_C3 and NODE3_C4. Rather, parity storage area NODE2_Ps is physically located elsewhere on third storage device 142 and only logically located between data storage areas NODE3_C1 and NODE3_C2, as indicated by the broken-line arrow pointing from the physical location of parity storage area NODE3_Ps to the logical location of parity storage area NODE3_Ps. Although not shown for purposes of clarity, the processor system that controls third storage device 142 includes logic similar to that described above with regard to first and second storage devices 138 and 140.

Note that third data storage device 142 in this embodiment includes not only parity storage area NODE3_Ps but also another parity storage area NODE3_PA5. Parity storage area NODE3_PA5 is of the mirrored type described above. That is, parity storage area NODE3_PA5 does not store parity information generated by an exclusive-OR operation but rather stores a copy of the data residing in data storage area NODE1_A5 of storage device 138, because the group of corresponding storage areas of which NODE3_A5 defines a portion consists of only data storage area NODE1_A5 and parity storage area NODE3_PA5. As described above, in an instance in which a group of corresponding storage areas consists of exactly two storage areas, mirroring is employed as a form of parity protection rather than the logical (e.g., exclusive-OR) type of parity protection. Also note that parity storage area NODE3_PA5 is not physically contiguous with the data storage areas but rather is logically located adjacent data storage area NODE3_C4, as indicated by the broken-line arrow pointing from the physical location of parity storage area NODE3_PA5 to the logical location of parity storage area NODE3_PA5.

Similarly, parity storage area NODE4_Pt of fourth storage device 144 is not physically contiguous with any data storage areas, as indicated by the broken-line arrow pointing from the physical location of parity storage area NODE4_Pt to the logical location of parity storage area NODE4_Pt. Likewise, parity storage area NODE4_Pu of fourth storage device 144 is physically located adjacent parity storage area NODE4_Pu but is logically located elsewhere, as indicated by the broken-line arrow pointing from the physical location of parity storage area NODE4_Pu to the logical location of parity storage area NODE4_Pu. Although not shown for purposes of clarity, the processor system that controls fourth storage device 144 includes logic similar to that described above with regard to the processor systems that respectively control first, second and third storage devices 138, 140 and 142. Accordingly, the processor system that controls fourth storage device 144 can determine the logical location of parity storage areas NODE4_Pt and NODE4_Pu. The processor system can also determine the group of corresponding storage areas of which parity storage area NODE4_Pt defines a portion: NODE1_A1, NODE2_B1, NODE3_C1 and NODE4_Pt. Likewise, the processor system can also determine the group of corresponding storage areas of which parity storage area NODE4_Pu defines a portion: NODE1_A4, NODE3_C4 and NODE4_Pu.

Figure 10:
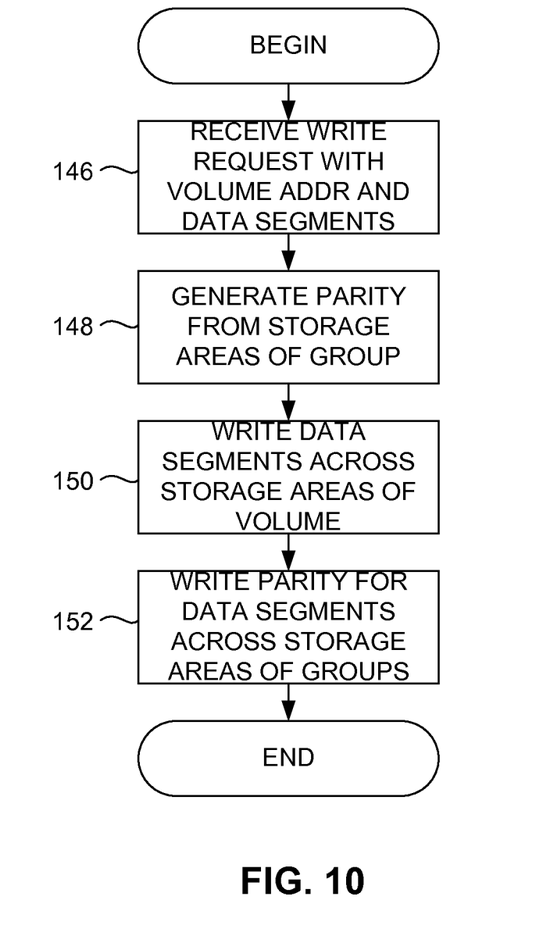
FIG. 10 is a flow diagram illustrating an exemplary method of operation of the data storage system of FIG. 2.

As illustrated in FIG. 10, the operation of embodiments of a data storage system of the type described above can be summarized as follows. The operation indicated by the flow diagram of FIG. 10 can be controlled through the processor systems of the various servers, in accordance with software or firmware programming of the processor systems, as described above. In FIG. 10, operation of the data storage system is only illustrated with regard to a write request. A read request is not illustrated because it is more straightforward, as it does not involve parity.

As indicated by block 146, a server can receive a write request via the network. The write request comprises one or more logically consecutive data segments and an indication of a data volume to which the data segments are to be written. The write request can be initiated by a host system or by any of the other servers of the data storage system. As indicated by block 148, the servers generate parity information using information read from one or more storage areas of the group of corresponding storage areas having the data storage area to which the data segment is to be written. Generating parity information can involve reading the previous or old data residing in the data storage area to which the data segment is to be written and forming the exclusive-OR of that old data and the new data to be written, to form an intermediate result. After reading the old data, the server can write the new data to that location, as indicated by block 150. Generating parity information can further include forming the exclusive-OR of the parity read from the parity storage area in the group to which the new data segment is written and the intermediate result. As indicated by block 152, the server can then update the parity information by replacing the old parity information with the result of this exclusive-OR operation. The server repeats these actions for each data segment to be written in association with the write request. The logically consecutive data segments span the data storage areas of the storage device corresponding to the indicated data volume. That is, logically consecutive data segments are written across correspondingly logically consecutive or logically contiguous data storage areas. In some instances, some or all of the logically consecutive data storage areas to which the data segments are written may also be physically contiguous on the data storage device. The parity information associated with the data segments that are written spans the various servers of the data storage system, thereby protecting the newly written data segments.

It should be noted that the invention has been described with reference to one or more exemplary embodiments for the purpose of demonstrating the principles and concepts of the invention. The invention is not limited to these embodiments. For example, in other embodiments a server can be associated with more than one logical volume, and a logical volume can span multiple servers. As will be understood by persons skilled in the art, in view of the description provided herein, many variations may be made to the embodiments described herein and all such variations are within the scope of the invention.

What is claimed is:

1. A data storage system, comprising:
at least three storage devices having a plurality of groups of corresponding storage areas among the at least three storage devices, the at least three storage devices including:
a first storage device storing data associated with a first unique data volume and controlled by a first processing system,
a second storage device storing data associated with a second unique data volume and controlled by a second processing system, and
a third storage device having a parity storage area and controlled by a third processing system;
a first group of corresponding storage areas being defined by at least a first data storage area of the first storage device, a first data storage area of the second storage device and the parity storage area of the third storage device such that the parity storage area includes parity information generated based on data associated with the first unique data volume and data associated with the second unique data volume, and a second group of corresponding storage areas being defined by at least a second data storage area of the first storage device and a second storage area of the second storage device, wherein the data storage system is operable to:
receive a request to write new data to a location within the first data storage area of the first storage device,
determine, using the first processing system, an exclusive-or of the new data and old data currently stored at the location;
transmit a result of the exclusive-or from the first processing system to the third processing system;
determine, using the third processing system, a new parity value representing an exclusive-or of the result and an old parity value associated with the location; and
replace the old parity value with the new parity value.

2. The data storage system claimed in claim 1, wherein:
the first storage device is associated with a first server having the first processing system controlling the first storage device;
the second storage device is associated with a second server having the second processing system controlling the second storage device;
the third storage device is associated with a third server having the third processing system controlling the third storage device; and
the first, second and third processing systems are mutually interconnected via a data network, and each of the first, second and third servers can effect a data access operation upon each of the others of the first, second and third servers.

3. The data storage system claimed in claim 2, wherein:
the parity storage area of the third storage device is a first parity storage area; and
the second group of corresponding storage areas is defined by the second data storage area of the first storage device, a second parity storage area of the second storage device, and a data storage area of the third storage device such that the second parity storage area includes parity information generated based on data associated with the first unique data volume and data associated with a third unique data volume stored by the third storage device.

4. The data storage system claimed in claim 2, wherein:
the parity storage area of the third storage device is a first parity storage area;
the second group of corresponding storage areas is defined by the second data storage area of the first storage device, a second parity storage area of the second storage device, and a first data storage area of the third device such that the second parity storage area includes parity information generated based on data associated with the first unique data volume and data associated with a third unique data volume stored by the third storage device; and
a third group of corresponding storage areas is defined by a third parity storage area of the first storage device, a second data storage area of the second storage device, and a second data storage area of the third storage device such that the third parity storage area includes parity information generated based on data associated with the second unique data volume and data associated with the third unique data volume.

5. The data storage system claimed in claim 2, wherein a mirrored one of the groups of corresponding storage areas has no more than two storage areas, each storage area of the mirrored one of the groups of corresponding storage areas is in a different one of the storage devices from the other storage area of the mirrored one of the groups of corresponding storage areas, and each storage area of the mirrored one of the groups of corresponding storage areas stores the same data as the other storage area of the mirrored one of the groups of corresponding storage areas.

6. The data storage system claimed in claim 2, wherein:
the parity storage area of one of the second and the third storage devices is not physically contiguous with a data storage area of the one of the second and third storage devices; and
the processing system controlling the one of the second and third storage devices includes a correspondence between a physical location of the parity storage area of the one of the second and third storage devices and a logical location of the parity storage area of the one of the second and third storage devices, the logical location of the parity storage area of the one of the second and third storage devices defining a portion of one of the groups of corresponding storage areas.

7. The data storage system claimed in claim 2, wherein the at least three storage devices include a storage device having only one or more data storage areas and no parity storage areas.

8. The data storage system claimed in claim 2, wherein the at least three storage devices include a storage device having only one or more parity storage areas and no data storage areas.

9. The data storage system claimed in claim 2, wherein at least two of the storage devices have different numbers of data storage areas from each other.

10. A method for storing data in a data storage system, the data storage system comprising at least three storage devices including:
a first storage device storing data contained within a first unique logical volume and associated with a first server having a first processing system controlling the first storage device,
a second storage device storing data contained within a second unique logical volume and associated with a second server having a second processing system controlling the second storage device, and
a third storage device storing parity data within a parity storage area, wherein the parity data is generated based on the data contained within the first unique logical volume and the data contained within the second unique logical volume, and wherein the third storage system is associated with a third server having a third processing system controlling the third storage device, the method comprising:
receiving a write request comprising at least one data segment and an indication of a logical volume, wherein the receiving includes one of the first, second and third processing systems receiving a write request via a data network from either a host system or another one of the first, second and third processing systems;
writing the at least one data segment to the indicated logical volume by writing the at least one data segment to one of the data storage areas of the storage device corresponding to the indicated logical volume;

generating parity information using information read from a logical volume other than the indicated logical volume and using the at least one data segment;

updating, with the generated parity information, the parity storage area;

adding a fourth server to the data storage system by connecting the fourth server to the data network, the fourth server having a fourth storage device and a fourth processing system controlling the fourth storage device, the fourth storage device having a data storage area;

determining if the data storage area of the fourth storage device has data to be preserved and, if it is determined that the data storage area of the fourth storage device has data to be preserved:

generating parity information using data read from one or more storage areas of the at least three storage devices; and updating, with the generated parity information, the parity storage area; and if it is determined that the fourth server does not have data to be preserved:

ensuring that the data storage area of the fourth storage device is zeroed before permitting a memory access operation to a data storage area grouped with the parity area; and permitting a memory access operation to a data storage area grouped with the parity area defining a portion of the one of the first group of corresponding storage areas and second group of corresponding storage areas before the generation of the parity information using data read from the at least three storage devices.

11. The method claimed in claim 10, wherein a mirrored group of corresponding storage areas has no more than two storage areas, and the method further comprises replicating data stored in one of the storage areas of the mirrored group of corresponding storage areas in another one of the storage areas of the mirrored group of corresponding storage areas, wherein each storage area of the mirrored group of corresponding storage areas is in a different one of the storage devices from the other storage area of the mirrored group of corresponding storage areas.

12. The method claimed in claim 10, wherein the parity storage area is not physically contiguous with a data storage area of the third storage device, and the method further comprises determining a correspondence between a physical location of the parity storage area and a logical location of the parity storage area.

13. The method claimed in claim 10, wherein:
the receiving of the write request comprises receiving a plurality of logically sequential data segments; and
the writing of the at least one data segment to the indicated data volume comprises writing each of the plurality of logically sequential data segments to one of the data storage areas of the storage device corresponding to the indicated data volume.

14. The method claimed in claim 10, wherein writing the at least one data segment to one of the data storage areas of the storage device corresponding to the indicated data volume comprises writing the at least one data segment to one of the data storage areas of a storage device having only one or more data storage areas and no parity storage areas.

15. The method claimed in claim 10, wherein at least two of the first, second and third data storage devices have different numbers of data storage areas.

16. The method claimed in claim 10, further comprising the step of:
detecting a failing device among one of the first, second and third storage devices; and
reconstructing data of a storage area of the failing device, wherein the storage area of the failing device defines a portion of a group of corresponding storage areas to be utilized, and data is reconstructed using information read from each storage area of the group of corresponding storage areas to be utilized except the storage area of the failing device.

17. A computer program product for operating a data storage system, the data storage system comprising at least:
a first storage device corresponding to a first unique data volume,
a second storage device corresponding to a second unique data volume, and
a third storage device having a parity storage area including parity information generated based on an exclusive-or of data associated with the first unique data volume and data associated with the second unique data volume,
the computer program product comprising a non-transitory computer-readable medium on which is stored in computer-readable form code that when executed on the data storage system causes the storage array system to:
receive a write request comprising at least one data segment to be written to a location within the first unique data volume and an indication of the first unique data volume;
write the data segment to the indicated first unique data volume by writing the data segment to the first storage device corresponding to the indicated first unique data volume;
generate parity information without accessing the second unique data volume by:
determining an intermediate value representing exclusive-or of the data segment to be written with an old data segment stored at the location using a processing resource coupled to the first storage device;
providing the intermediate value from the processing resource to another processing resource coupled to the third storage device; and
determining the parity information based on the exclusive-or of the intermediate value and old parity information corresponding to the location; and
update, with the generated parity information, the parity storage area.

* * * * *